United States Patent [19]

Gross

[11] Patent Number: 5,315,108
[45] Date of Patent: May 24, 1994

[54] PROCESS AND DEVICE FOR ACTING UPON MOVING CONTAINERS WITH A LASER BEAM AND CAROSEL SHAFTED MOUNTED OPTICS

[75] Inventor: Norbert Gross, Dietikon, Switzerland

[73] Assignee: Elpatronic AG, Zug, Switzerland

[21] Appl. No.: 962,317

[22] Filed: Oct. 15, 1992

[30] Foreign Application Priority Data

Nov. 1, 1991 [CH] Switzerland ............ 03199/91

[51] Int. Cl.⁵ .................................. G01N 9/04
[52] U.S. Cl. ........................ 250/223 B; 356/240
[58] Field of Search ........... 250/223 R, 223 B, 216, 250/235, 236; 356/239, 240

[56] References Cited

U.S. PATENT DOCUMENTS 4,620,090 10/1986 Ducloux ................. 250/223 B
4,967,070 10/1990 Ringlien et al. .

FOREIGN PATENT DOCUMENTS 0354362  2/1990 European Pat. Off. .
2234613  1/1975 France .
2270018 12/1975 France .
2134449  8/1984 United Kingdom .

Primary Examiner—David C. Nelms
Attorney, Agent, or Firm—McCormick, Paulding & Huber

[57] ABSTRACT

In an inspection or processing machine machine for returned PET multitrip bottles the bottles are acted upon by a laser beam, in order to examine the bottles and/or read a code on the bottle and/or write a code on the bottles. The bottles run in the machine on a carousel. The laser beam is directed through a central hollow shaft of the carousel via mirrors onto the bottle. The moving bottles can thereby be acted upon in a simple manner.

7 Claims, 2 Drawing Sheets

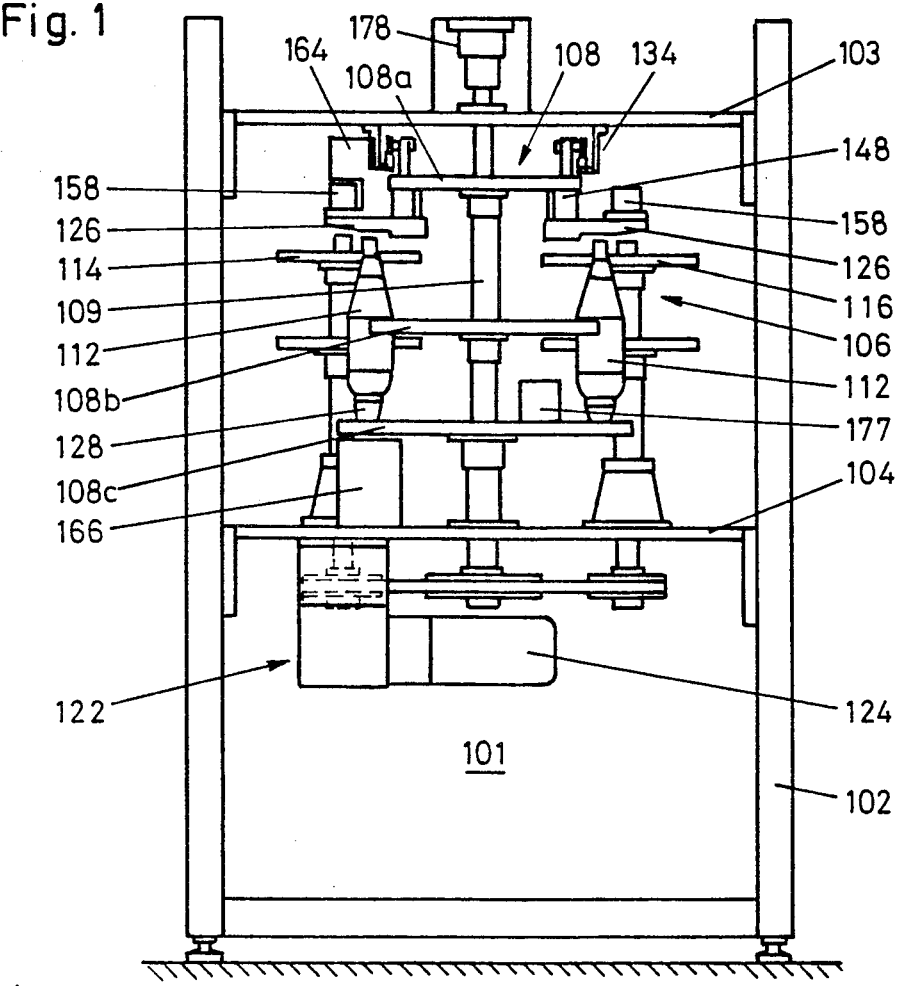
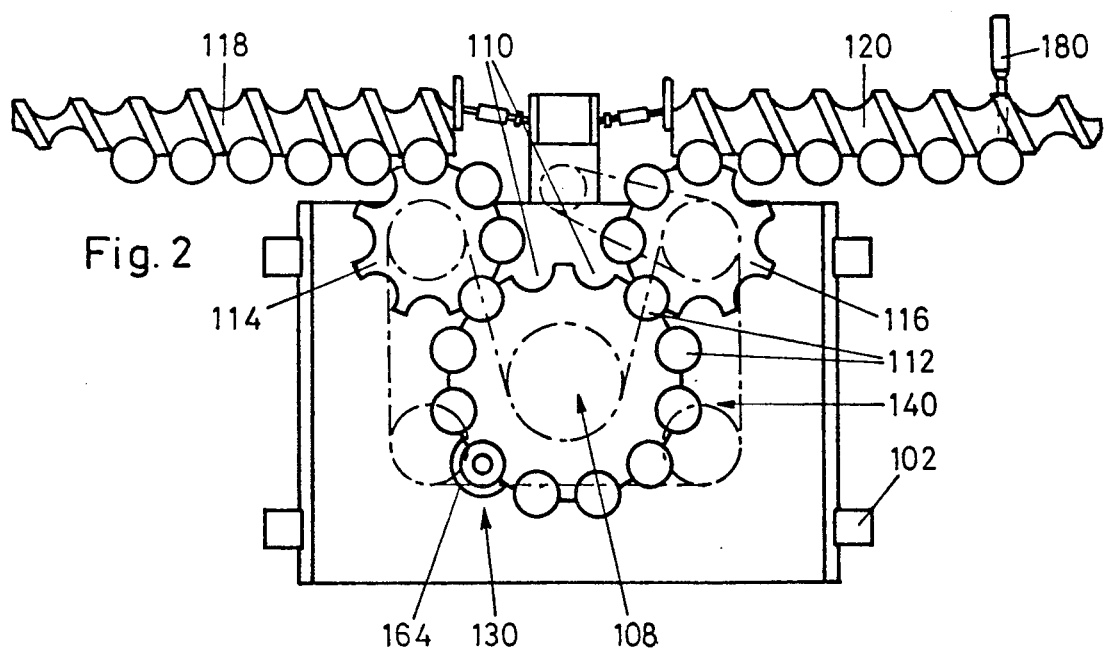

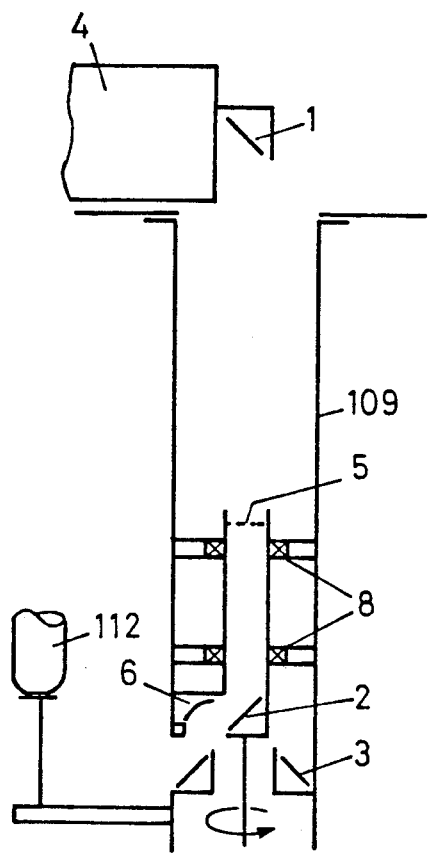
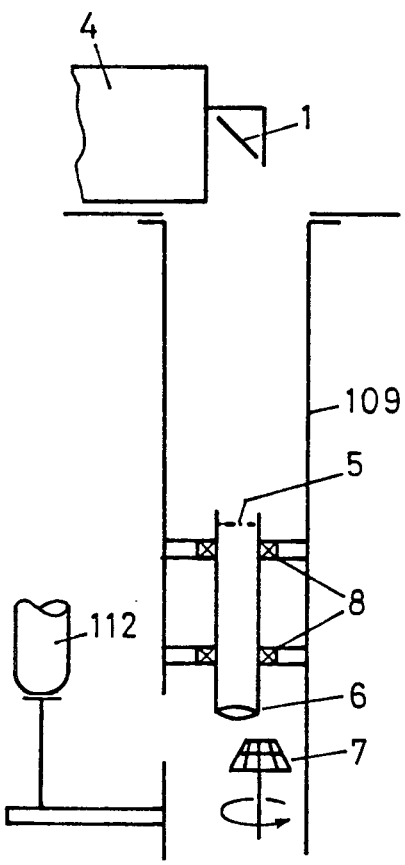
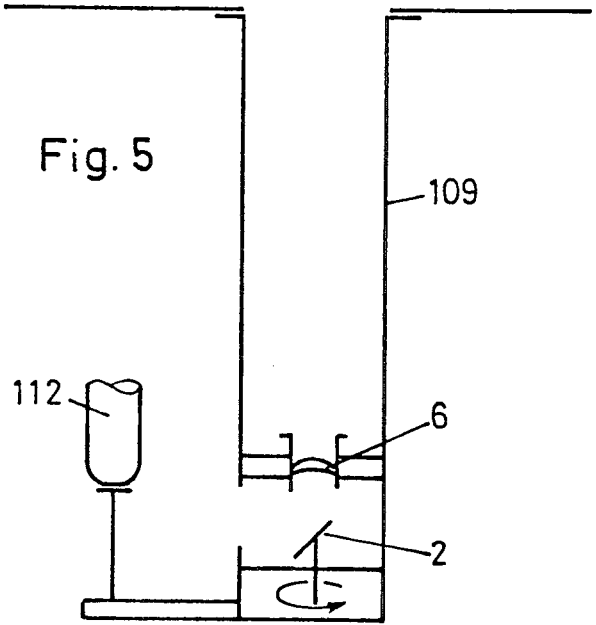

PROCESS AND DEVICE FOR ACTING UPON MOVING CONTAINERS WITH A LASER BEAM AND CAROSEL SHAFTED MOUNTED OPTICS

BACKGROUND OF THE INVENTION

The invention relates to a process for acting upon containers, particularly PET bottles, moving through a conveying means, having at least one laser beam for the inspection and/or processing of the containers, more especially for the introduction of at least one code symbol. Furthermore, the invention relates to an inspection machine for bottles in order to carry out the process.

It is known for containers, particularly reusable or multitrip PET bottles, to be inspected in inspection machines and to be provided with a code. The inspection may include in particular the examination of the bottle for damage and/or the reading of one or more code symbols existing on the bottle. As a rule, at least one further code symbol is introduced by the inspection machine. This introduction or sealing-in of the code symbol and if necessary, the reading of code symbols is achieved by means of at least one laser beam which is generally directed onto the bottle at a desired predetermined point. An examination for damage can also be made by means of laser beams.

Known installations for the inspection and/or coding of PET bottles with laser radiation are characterised by static beam guidance. The parts being processed are so positioned in front of the beam that the coding surface is acted on by the beam. For this, the conveying movement must be suspended for the period of the coding operation or the coding must be carried out in the shortest possible time. The disadvantages of this manner of operation lie in the high accelerations and low productivity of laser and machine.

The problem therefore underlying the invention is to process and/or measure or inspect containers, more especially PET bottles, by means of a laser beam during passage through the inspection machine, this being intended to take place with as high as possible frequency and productivity.

SUMMARY OF THE INVENTION

This problem is solved in a process of the type hereinbefore mentioned, in that the laser beam is led via an arrangement of mirrors which are stationary and/or movable in relation to the conveying means in order to run, over at least one section of the conveying path, moving synchronously with the container while acting thereupon.

The process is preferably used in an inspection machine for bottles, more especially PET bottles, which has a corresponding conveying device.

The inspection machine is preferably designed as a carousel arrangement.

The beam is preferably directed exactly onto the carousel axis, and thus it can be radially deflected by a mirror fixedly mounted on this axis and constantly moving synchronously with the carousel. A preferred construction can be as follows:

The laser is fixedly mounted on the machine, so that a first deflecting mirror which is present in the standard way deflects the beam centrally into the carousel axis which is formed as a hollow central shaft.

Inside the hollow shaft there is the mask in the path of the beam and below it a second deflecting mirror, which radially deflects the beam through 90°. If this deflecting mirror is fixedly mounted on the carousel axis, the laser beam will adopt a constant position in relation to the axis, independently of the speed of rotation of the carousel.

Immediately beyond the second mirror can be arranged a lens or a parabolic mirror, in order to form an image of the mask on the bottle.

This arrangement can be advantageously supplemented by a further deflecting mirror opposite each of the bottle holders, with which fine positioning of the beam is obtained.

BRIEF DESCRIPTION OF THE DRAWINGS

Specific embodiments of the invention will be described in greater detail below by reference to the drawings, in which:

FIG. 1 shows an overall view of an inspection machine;

FIG. 2 shows a simplified top plan view of the carousel of an inspection machine according to FIG. 1;

FIG. 3 shows a diagrammatic partial view of the carousel of an inspection machine according to the invention;

FIG. 4 shows a further specific embodiment of the invention; and

FIG. 5 shows a further specific embodiment of the invention that is likewise only diagrammatically and partly illustrated.

DESCRIPTION OF THE PREFERRED EMBODIMENTS

In FIGS. 1 and 2 is shown an inspection machine, known per se, which will be briefly explained to begin with, for a better understanding of the subsequent exemplified embodiments of the invention. This particular inspection machine is, however, illustrated merely as an example and for a better understanding of FIGS. 3 to 5; the invention can also readily be used with other inspection machines.

The machine is indicated generally by the reference 101 in FIG. 1. It has a frame 102 with an upper support plate 103 and a lower support plate 104, between which is fastened a carousel arrangement indicated generally by the reference 106. The carousel arrangement 106 has a central carousel 108 with twelve receptacle arrangements 110 for bottles 112 and also two smaller carousels 114 and 116, each with eight receptacle arrangements. The carousel arrangement 106 is part of a conveying device, with which the bottles 112 are moved to a detection station 130 for examination and code reading, and to a marking station 140 for code writing, which is described in greater detail further on. The two smaller carousels 114 and 116 in conjunction with two worm conveyors 118 and 120 convey the bottles 112 into and out of the machine 101. Underneath the lower support plate 104 a common drive system 122 is secured, comprising a geared motor 124 which drives the carousel arrangement 106 and the worm conveyors 118 and 120 via toothed belt pulleys and toothed belts which are not indicated in detail.

The central carousel 108 is composed of an upper main carousel 108a, a central main carousel 108b and a lower main carousel 108c, which are all fastened to a common shaft 109 which forms the carousel axis. The receptacle arrangements 110 comprise recesses or pockets, semicircular in profile, on the central main carousel 108b, twelve heads 126 provided on the upper main carousel 108a (only two are visible in FIG. 1), and twelve rotatable seats 128 provided on the lower main carousel 108c, for receiving clamping and mounting the bottles 112. Each head 126 is fastened to the upper main carousel 108a so as to be movable vertically by a cam track. The course or shape of the cam track is so selected that the head 126 in the area of the entry carousel 114 is disposed at a spacing above the bottle mouth, that during the movement of the bottle 112 to the detection station 130 is lowered onto the bottle mouth and remains lowered at least until reaching the marking station 140, and is finally raised again from the bottle and moved back into its original height, at which it is again at a spacing from the bottle mouth.

The device described heretofore for marking refillable or multitrip transparent bottles operates as follows, briefly summarised.

After each bottle 112 at the outlet of the device has passed the worm conveyor 118 and entered the carousel 114, it is vertically clamped in a receptacle arrangement 110 of the central carousel 108 as the head 126 is lowered. After clamping, some time is available to allow any vibration to die out. The bottle 112 then passes the detection station 130, at which the bottle is inspected and a code which is already on the bottle is read. This data is transmitted to a main controller and from here to a carousel microcontroller. The carousel microcontroller controls stepping motors 158 for rotating the seat 128, in order to bring the bottle 112 into the position in which it can be marked with a new code symbol. After the introduction of the new code symbol at the marking station 140 the bottle is released as the head 126 is raised. The carousel 116 and the worm conveyor 120 of the machine 101 then convey the bottle 112 out of the carousel arrangement 101.

FIG. 3 now shows diagrammatically a part of the carousel including the axle 109 of the carousel which is formed as a hollow shaft. Also illustrated, by way of example, is a bottle 112 which is carried by the carousel around the hollow shaft and in this instance is to be provided with a code.

The beam from a laser 4 is directed exactly into the carousel axle or hollow shaft 109. It can thus be radially deflected by a mirror which is fixedly mounted in the axle and constantly moves synchronously with the carousel.

The laser 4 is mounted fixedly on the machine, so that the first deflecting mirror 1 which is present in the conventional manner deflects the beam centrally along the carousel central axle 109.

Inside the hollow shaft and in the path of the beam there is situated a mask 5 with the code pattern, and below it a second deflecting mirror 2, which radially deflects the beam through 90°. If this deflecting mirror 2 is mounted fixedly on the axle or if the mirror is moved synchronously to the hollow shaft 109, the laser beam will adopt a constant position in relation to the periphery of the carousel, independently of the speed of rotation of the carousel.

Immediately beyond the second mirror a lens or a parabolic mirror 6 can be arranged as a focusing mirror, in order to form an image of the mask on the bottle. The image of the mask is burnt into the PET bottle material by the laser beam.

This arrangement is appropriately supplemented by a further deflecting mirror 3 opposite each receptacle arrangement of the central carousel 108, with a window provided in the hollow shaft for each mirror 3, with which fine positioning of the beam can be obtained. After the processing of a bottle, the mirror 2 or the beam guide comprising the elements 5, 2 and 6 is promptly positioned onto the next window or deflecting mirror 3, in order to process the next bottle.

The exact centering of the beam in the carousel axle is important for the satisfactory functioning of the construction. The conventional mounting of the first mirror 1 permits only the setting of two axes of tilt and for this reason would not be able to satisfy the requirements. It must be assumed therefore that during assembly there are positioning errors of laser and main axle. An axially and linearly adjustable mounting 8 for the mirror 2 can therefore be provided for compensation. The mask mounting 5, the second mirror 2, and also the focusing optics 6 will advantageously be combined together as a pre-assembled beam guide adjustable in the mounting 8, because these elements are arranged in fixed positions in relation to each other. This beam guide must be rotatably mounted in the main axle, and this is best achieved by direct mounting in the axle. Merely the lens (parabolic mirror) has to be linearly adjustable for fine setting of the sharpness of the image.

The final deflecting mirrors 3 are positioned fixed in the circumference of the hollow shaft, and the adjustability of two tilt angles is adequate here.

After a bottle has been taken into the main carousel it is set in constant rotation by the seat 128 on which it rests. The image-forming optics are aligned onto this bottle and follow the movement of the carousel. A code can now be marked as the rotation proceeds. After conclusion of the marking operation the optics must be realigned onto the following bottle.

The obvious disadvantage of this construction, that rapid reversing rotating movements have to be carried out with the optics, can be avoided by the use of a polygonal mirror 7, as shown in FIG. 4. The latter advantageously represents the final deflecting unit of the beam guide and is mounted directly below the focusing optics, so that the mirror surfaces lie in the path of the axially centered beam.

The polygonal mirror 7 is characterised in that it carries the same number of mirror faces as the bit number of the coding. Each of the mirror faces produces a 90° deflection and is tilted through a small angle in relation to the axis which is perpendicular thereto and to the direction of propagation. The effect of these tilts is that the faces form tangents to a spiral so that the angle of tilt changes progressively with each succeeding mirror face of the polygon and the deflected beam thereby tracks the bottle which is rotating past. It is important for the function that the speed of the polygonal mirror be adjusted exactly to the pulse frequency of the beam, that is to say, the pulse frequency of the beam must equal the product of the angular velocity of the polygonal mirror and the number of faces it has. The rotation of the bottle itself and also the rotation of the carousel must also be accurately matched to the speed of the polygonal mirror. This latter relationship can be so arranged that each succeeding face of the polygon mirror directs the beam onto the same position on the carousel, independently of speed, and the rotation of the bottle determines the spacing of the code elements.

Optical inspections can also be carried out with a polygonal mirror which is specifically designed for this use. If, for example, the number of mirror surfaces is increased sufficiently, a beam can be directed almost continuously towards a bottle on the carousel and follow it precisely. The length of the tracking distance is given by the sum of the changes of angle.

For laser beams of larger diameter (coding), flat mirror surfaces are necessary, as otherwise image distortion occurs. On the other hand, a spherical polishing may be necessary in the event of the use of beams of small diameter if high demands are made on positioning accuracy and the number of mirror surfaces is to be limited.

A further specific embodiment is shown in FIG. 5, in which identical reference numbers indicate the same components as in the foregoing description. In this example the mask 5 is arranged between the laser 4 and the first mirror 1. The image-forming optics 6 are stationary, whereas the mirrors 1 and 2 are moved synchronously with the bottle 112.

The object of this modification is to eliminate the rotation of the beam relative to the mask and the rotation of the image on the bottle. The necessity of rotating mask and lens with the carousel thereby becomes unnecessary.

To this end, the mask is mounted in front of the first deflecting mirror. The mask image is rotated and deflected 90° by the first mirror. The beam must be centered on the axis of rotation of the mirror. The lens is firmly mounted centrally in the beam or carousel axle at a corresponding spacing from the mask (merely linear focusing adjustment). Directly below the lens is rotatably mounted a second deflecting mirror, which guides the focused beam onto the bottle.

Both deflecting mirrors must constantly carry out the same rotating movements synchronously and be mounted on the carousel axis. The rotation is composed of:
1. rotation at carousel speed through an angle corresponding to pocket or receptacle arrangement distribution;
2. rapid reset movement (without laser operation).

It is advantageous in the case of this arrangement that only two mirrors have to be used, and for this reason very high throughput speeds are achieved.

Setting up for different types of bottles (angle and spacing variations) can easily be carried out.

Angle variation: adjust only axis of the lower deflecting mirror.

Distance variations: only linear adjustment of mask, lens and lower mirror.

Accessibility and adjustability are better than in the first two embodiments. The optics inside the hollow shaft are all at the center, the best arrangement for dust/water protection.

I claim:

1. Process for acting upon containers which are moving along a conveying path through a conveying means with at least one laser beam for inspection and/or processing of the containers, characterized by conveying the containers along the conveying path by means of a carousel having a hollow central shaft about which the containers move, directing the laser beam through the hollow central shaft and guiding the laser beam via a mirror arrangement which is mounted in relation to the hollow central shaft to scan the beam over at least one section of the conveying path synchronously with each container to act thereupon.

2. A machine for processing bottles with at least one laser beam comprising:
   conveying means including a carousel having a hollow central shaft for moving the bottles along a conveying path;
   a laser light source producing a laser beam which is directed from the source into the hollow central shaft of the carousel and then onto the bottles moved by the conveying means; and
   mirror means mounted in relation to the hollow central shaft of the carousel to guide the laser beam from the shaft over at least one section of the conveying path synchronously with each container to cause the beam to act upon a bottle moving along the conveying path.

3. A machine for processing as defined in claim 2, characterized in that the mirror means is mounted inside the hollow shaft.

4. A machine for processing as defined in claim 3 characterized in that a mask having a predetermined pattern thereon is mounted in the laser beam from the source; the mirror means receives the laser beam after the beam passes through the mask; and a focusing means is provided for focusing the beam on a bottle.

5. A machine for processing as defined in claim 3, characterized in that the laser beam emerging from the mirror means is directed from the hollow shaft onto the bottle by means of a deflecting mirror which is also mounted in the hollow shaft.

6. A machine for processing as defined in claim 3, characterized in that the mirror means comprises a rotatable polygonal mirror, on which the laser beam impinges; and a mask and a focusing lens are provided through which the laser beam passes onto the polygonal mirror.

7. A machine for processing as defined in claim 3, characterized in that a mirror is provided to direct the laser beam onto the mirror means inside of the hollow shaft; and a mask and a focusing lens are provided along the path traversed by the laser beam prior to the beam being deflected onto the bottle by the mirror means.

* * * * *